(12) United States Patent
Zelechonok

(10) Patent No.: US 11,307,181 B1
(45) Date of Patent: Apr. 19, 2022

(54) HPLC SYSTEM WITH MIXED-MODE COLUMNS FOR MEASURING CHARGED ANALYTES IN COMPLEX MIXTURES

(71) Applicant: Yury Zelechonok, Northbrook, IL (US)

(72) Inventor: Yury Zelechonok, Northbrook, IL (US)

(73) Assignee: SIELC Technologies Corporation, Wheeling, IL (US)

( * ) Notice: Subject to any disclaimer, the term of this patent is extended or adjusted under 35 U.S.C. 154(b) by 267 days.

(21) Appl. No.: 16/510,913

(22) Filed: Jul. 13, 2019

Related U.S. Application Data

(60) Provisional application No. 62/698,049, filed on Jul. 14, 2018.

(51) Int. Cl.
| | |
|---|---|
| *G01N 30/46* | (2006.01) |
| *G01N 30/22* | (2006.01) |
| *G01N 30/36* | (2006.01) |
| *G01N 30/02* | (2006.01) |
| *G01N 30/20* | (2006.01) |

(52) U.S. Cl.
CPC .......... *G01N 30/468* (2013.01); *G01N 30/22* (2013.01); *G01N 30/36* (2013.01); *G01N 30/461* (2013.01); *G01N 2030/027* (2013.01); *G01N 2030/201* (2013.01)

(58) Field of Classification Search
CPC .. G01N 2030/027; G01N 30/22; G01N 30/36; G01N 30/461; G01N 30/468
See application file for complete search history.

(56) References Cited

U.S. PATENT DOCUMENTS

| | | | |
|---|---|---|---|
| 3,373,872 A | 3/1968 | Hrdina | |
| 4,116,046 A | 9/1978 | Stein | |
| 5,117,109 A | 5/1992 | Asakawa et al. | |
| 5,139,681 A | 8/1992 | Cortes et al. | |
| 5,389,221 A | 2/1995 | Jorgenson et al. | |
| 5,803,117 A * | 9/1998 | Olsen | F16K 11/0743 137/625.11 |
| 5,935,522 A | 8/1999 | Swerdlow et al. | |
| 6,012,487 A * | 1/2000 | Hauck | F16K 11/0743 137/625.11 |
| 6,344,172 B1 | 2/2002 | Afeyan et al. | |
| 6,893,569 B2 | 5/2005 | Zelechonok | |

(Continued)

OTHER PUBLICATIONS

Silva et al, An automated and self-cleaning nano liquid chromatography mass spectrometry platform featuring an open tubular multi-hole crystal fiber solid phase extraction column and an open tubular separation column, Journal of Chromatography A, 1518 (2017) 104-110 (Year: 2017).*

(Continued)

*Primary Examiner* — David L Singer
(74) *Attorney, Agent, or Firm* — John C. Shepard

(57) ABSTRACT

Disclosed is a HPLC system including a first dimension column, a second dimension column, a high pressure switching valve installed along the mobile phase flow path with the usual detector. At a predetermined time after injection of a sample into the mobile phase stream, the valve is actuated so that late eluted components, while still in the first dimension column, are back-flushed to waste by the flow of mobile phase while the analytes get separated in the second dimension column. Mixed-mode cation exchange and anion exchange columns are particularly suited for this application.

12 Claims, 14 Drawing Sheets

(56) References Cited

U.S. PATENT DOCUMENTS

| | | | |
|---|---|---|---|
| 6,942,793 | B2 | 9/2005 | Ito et al. |
| 8,101,422 | B2 | 1/2012 | Ito et al. |
| 8,568,594 | B2 | 10/2013 | Gilar et al. |
| 8,621,915 | B2 | 1/2014 | Liu et al. |
| 8,642,351 | B2 | 2/2014 | Liu et al. |
| 8,658,034 | B1 | 2/2014 | Nugent et al. |
| 8,716,025 | B2 | 5/2014 | Witt |
| 9,115,178 | B2 | 8/2015 | Gilar et al. |
| 9,566,537 | B2 | 2/2017 | Geng |
| 10,101,306 | B2 | 10/2018 | Venkatramani et al. |
| 2007/0199874 | A1 | 8/2007 | Ito et al. |
| 2008/0178693 | A1* | 7/2008 | Davison ................ G01N 30/20 73/863.72 |
| 2008/0314129 | A1* | 12/2008 | Schultz ................ G01N 30/80 73/61.55 |
| 2010/0043539 | A1* | 2/2010 | Fadgen ................ G01N 30/20 73/61.55 |
| 2010/0107742 | A1* | 5/2010 | Liu ........................ G01N 30/34 73/61.56 |
| 2011/0097813 | A1 | 4/2011 | Ito et al. |
| 2012/0240666 | A1 | 9/2012 | Sims |
| 2013/0014568 | A1 | 1/2013 | Lee et al. |
| 2016/0025689 | A1* | 1/2016 | Glatz .................... G01N 30/32 73/61.55 |
| 2016/0274069 | A1* | 9/2016 | Fujita ..................... G01N 30/24 |
| 2017/0219539 | A1* | 8/2017 | Wachinger ............ G01N 30/20 |
| 2017/0343520 | A1* | 11/2017 | Ortmann ................ G01N 30/04 |
| 2018/0306758 | A1* | 10/2018 | Wachinger ............ G01N 30/20 |
| 2020/0016511 | A1* | 1/2020 | Lauber ............... B01D 15/1871 |

OTHER PUBLICATIONS

Svendsen et al, Automatic filtration and filter flush for robust online solid-phase extraction liquid chromatography, J. Sep. Sci. 2011, 34, 3020-3022 (Year: 2011).*

Kollroser et al, Direct-injection high performance liquid chromatography ion trap mass spectrometry for the quantitative determination of olanzapine, clozapine and N-desmethylclozapine in human plasma, Rapid Communications in Mass Spectrometry 2002; 16: 1266-1272 (Year: 2002).*

Roberg-Larsen et al, High sensitivity measurements of active oxysterols with automated filtration/filter backflush-solid phase extraction-liquid chromatography-mass spectrometry, Journal of Chromatography A, 1255 (2012) 291-297 (Year: 2012).*

Roberg Larsen, Highly automated nano-LC/MS-based approach for thousand cell-scale quantification of side chain-hydroxylated oxysterols, Journal of Lipid Research vol. 55, 2014 (Year: 2014).*

Johnsen et al, Liquid chromatography-mass spectrometry platform for both small neurotransmitters and neuropeptides in blood, with automatic and robust solid, Scientific Reports | 5 : 9308 | DOI: 10.1038/srep09308 (Year: 2015).*

Vesterdal, Thesis Comparing methods for sensitive determination of Hedgehog active oxysterols, Universitetet I Oslo (Year: 2015).*

Zhang et al, Mixed-mode chromatography in pharmaceutical and biopharmaceutical applications, Journal of Pharmaceutical and Biomedical Analysis 128 (2016) 73-88 (Year: 2016).*

ThermoFisher Scientific, Mixed Mode HPLC Columns (Year: 2016).*

Gan et al, A novel aptamer-based online magnetic solid phase extraction method for the selective determination of 8-hydroxy-20-deoxyguanosine in human urine, Analytica Chimica Acta 1008 (2018) 48-56 (Year: 2018).*

Johnsen, Dissertation High performance analytical tools for small molecules in biosamples, Department of Chemistry, Faculty of Mathematics and Natural Sciences, University of Oslo (Year: 2016).*

Brandtzaeg et al, Proteomics tools reveal startlingly high amounts of oxytocin in plasma and serum, Scientific Reports | 6:31693 | DOI: 10.1038/srep31693 (Year: 2016).*

Nagy et al, Protocol for the purification of protected carbohydrates: toward coupling automated synthesis to alternate-pump recycling high-performance liquid chromatography, Chem Commun (Camb). Nov. 21, 2016; 52(90): 13253-13256 (Year: 2016).*

Xue et al, Quantitative determination of pioglitazone in human serum by direct-injection high-performance liquid chromatography mass spectrometry and its application to a bioequivalence study, Y.-J. Xue et al. / Journal of Chromatography B 795 (2003) 215-226 (Year: 2003).*

Roberg-Larsen et al, Rugged Large Volume Injection for Sensitive Capillary LC-MS Environmental Monitoring, Frontiers in Chemistry, Aug. 2017 | vol. 5 | Article 62 (Year: 2017).*

Solheim, Thesis Exploring selectivity and sensitivity for oxysterol measurements using liquid chromatography-mass spectrometry (LC-MS), University of Oslo (Year: 2018).*

Nielsen et al, UHPLC-MS/MS Determination of Ochratoxin A and Fumonisins in Coffee Using QuEChERS Extraction Combined with Mixed-Mode SPE Purification, J. Agric. Food Chem. 2015, 63, 1029-1034 (Year: 2015).*

Waters Alliance e2695 Separations Module Operator's Guide (Year: 2013).*

* cited by examiner

Nitrate concentration in some products measured by current method

| Item | Nitrate Concentration (in PPM) |
|---|---|
| Black Watermelon from grocery store | 1.19 |
| Green Watermelon from grocery store | 13.13 |
| Melon 1 from grocery store | 3.06 |
| Melon 2 from grocery store | 5.95 |
| Melon 3 from grocery store | 39.44 |
| Gorna Bania(R) Bulgarian mineral water | >0.10 |
| Mineral water San Pellegrino brand | 2.08 |
| Municipal tap water (Wheeling, IL) | 0.72 |
| Distilled water from Walmart | >0.10 |
| Apple from local grocery store | 0.80 |
| Peach from local grocery store | 0.33 |
| Mandarin (fruit) from grocery store | 0.18 |
| Trader Joe's salami | 0.48 |
| Sausages from grocery store | 5.28 |
| Bologna from grocery store | 4.10 |
| Homemade chicken broth | 2.55 |
| Radish roots from the garden | 107.75 |
| Celery from the garden | 101.57 |
| Cilantro (Coriander) fresh | 46.67 |
| Salad Greens (fresh from the garden) | 109.18 |
| Salad Green (one day old) | 1500.00 |
| Mango (fresh from a tree) | 1.40 |
| Cucumber (fresh from a garden) | 3.47 |
| Urine human | 22.20 |
| Soil from the garden | 5.60 |

Fig. 10

Complex peptides mixture separated on first dimension column (one column) and target peptide on a single column.

Column: Primesep SB
Column size: 2.1 × 150 mm, 5 μm
Mobile phase: Gradient MeCN 2 - 20 % 15 min, 5 min hold
Buffer: Ammonium Formate - 10 mM, pH 3.0
Flow rate: 0.2 mL/min
UV Detection: 280 nm
Injection volume: 100 μL Copyright © SIELC Technologies 2019

Target peptides on second dimension column

Column: Primesep 200
Column size: 4.6 × 150 mm, 5 μm
Mobile phase: Gradient MeCN – 20 - 50 % 15 min
Buffer: Gradient Ammonium Formate - 50 - 250 mM pH 3.0
Flow rate: 1 mL/min
UV Detection: 280 nm Copyright © SIELC Technologies 2019

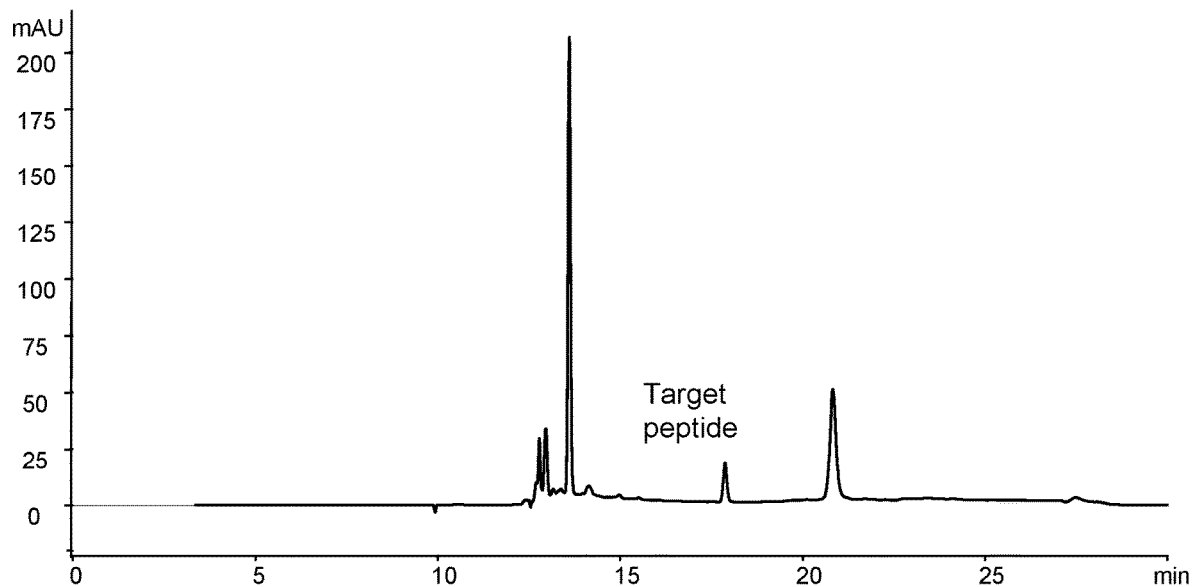

Target peptides mixture on second dimension column after passing through the first dimension column

| | |
|---|---|
| Flip column: | Primesep SB |
| Flip Column size: | 2.1 × 150 mm, 5 µm |
| First Switching time: | 9.9-10.5 min |
| Mobile phase: | Gradient MeCN – 2 - 60%, 15 min |
| Buffer: | AmFm-10 mM, pH 3.0 |
| Flow rate: | 0.2 mL/min |
| | |
| Analytical column: | Primesep 200 |
| Column size: | 4.6 × 100 mm, 5 µm |
| Second Pump Mobile phase: | Gradient MeCN– 20-50%, 10-20 min |
| Buffer: | Gradient AmFm-50 - 250 mM, 10-20 min |
| Flow rate: | 1 mL/min |
| Second Switching time: | 17.7-18.4 min |
| | |
| UV detection: | 280 nm |
| Injection volume: | 100 µL |

Fig. 16

Copyright © SIELC Technologies 2019

Target peptides on second dimension column. Isolated fraction from 17 to 19 min on dual column system.

| | |
|---|---|
| Column: | Primesep 200 |
| Column size: | 4.6 × 150 mm, 5 μm |
| Mobile phase: | Gradient MeCN – 20 - 50 % 10 min |
| Buffer: | Gradient Ammonium Formate - 50 - 250 mM pH 3.0 15 min |
| Flow rate: | 1 mL/min |
| UV Detection: | 280 nm |

Copyright © SIELC Technologies 2019

HPLC SYSTEM WITH MIXED-MODE COLUMNS FOR MEASURING CHARGED ANALYTES IN COMPLEX MIXTURES

CROSS-REFERENCE TO RELATED APPLICATIONS

This application claims priority to and the benefit of Provisional Patent Application Ser. No. 62/698,049, filed Jul. 14, 2018, which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DESCRIPTION

Background of the Invention

Technical Field

The present invention relates to high pressure liquid chromatography systems and, more particularly, to such a system using multiple mixed-mode columns connected to a switching valve.

Background Art

Conventional high pressure liquid chromatography ("HPLC") systems and ultra high pressure liquid chromatography ("UHPLC") systems usually include a high-pressure pump, an injector (such as an autosampler or some other sample introduction device), a chromatography column, and a detector. Each unit can be completely separate devices with their own mechanical, electrical, and electronic components. HPLC is often referred to as "High Performance Liquid Chromatography."

Typically, a sample to be analyzed using HPLC is a solution of analytes in an appropriate solvent. The required amount of the sample is injected into the chromatography liquid stream ("mobile phase") that is moved by a high-pressure pump and is separated into individual components in the column. The separated sample components are then measured individually by the detector.

Samples from natural sources (e.g., fruit, vegetables, water, soil, culinary products, body fluids) are complex mixtures containing multiple chemical compounds. Measuring a particular component, such as nitrate, in these samples by HPLC is complicated because of interferences created from all the compounds present. In addition, inconsistency of the sample's composition leads to difficulties of developing a stable HPLC method that can be used across a variety of products. In these situations, operational life of a column is usually short even with sample cleaning due to irreversibly retained contaminations. As a result, long cleaning procedure and guard columns are often employed.

Previous methods employed to separate the components of complex compounds are complicated and take significant time to execute. In addition, the above-described methods are specific only for the particular sample that the research was focused on.

BRIEF SUMMARY OF THE INVENTION

The present invention is directed to overcoming one or more of the problems as set forth above.

It is a primary object of the present invention to improve chromatography separation results and extend the useful life of chromatography columns during separation by initially passing mobile phase that may have unwanted material through a first dimension column and thereafter passing the partially separated sample through a second dimension column while simultaneously backwashing the first dimension column.

An object of the present invention is to avoid the interference of most contaminants by employing a first dimension column, such as a cleaning column, and a high pressure switching valve before a second dimension column, such as an analytical column.

In an exemplary embodiment, mixed-mode columns with reverse phase and ion-exchange characteristics are used to combine sample cleaning and analyte separation to analyze sample in one automated process.

In another exemplary embodiment, the first dimension column and the second dimensional column have orthogonal retention characteristics for operational efficiency.

Disclosed hereafter is an analytical HPLC system for measuring charged analytes in complex mixtures comprised of a chromatography column with mixed-mode characteristics with the column surface charge opposite to the analyte charge and having a 6-port switching valve and a mixed-mode chromatography column with surface charge similar to the analyte charge.

Disclosed hereafter is an analytical HPLC system for measuring charged analytes in complex mixtures where a switching valve is installed between an autosampler and a second dimension column and where the relative position of a first dimension column can be changed by the switching valve to be serially connected upstream of the second dimension column or downstream from the detector.

Disclosed hereafter is a first dimension column that can be operated in either of two switchable directions, namely, in a normal direction when sample is introduced and in a reverse direction when the first dimension column is connected in a cleaning position downstream from the detector.

Described hereafter is a method and approach that allows minimization of sample preparation, prolongs the life of chromatography columns, and allows analysis of the samples of different origins by the same method. This method was developed for measuring nitrates in food products and for isolating target peptides, but it can be used efficiently for many other analytes in different matrices.

BRIEF DESCRIPTION OF THE SEVERAL VIEWS OF THE DRAWINGS

The details of construction and operation of the invention are more fully described with reference to the accompanying drawings which form a part hereof and in which like reference numerals refer to like parts throughout.

In the drawings:

FIG. 10 is a table showing the concentration of nitrates in food items typically found in a grocery store;

FIG. 16 is a chromatogram using a first dimension mixed-mode column and a second dimension mixed-mode column as disclosed herein analyze a sample of purified peptide; and, FIG. 17 is a chromatogram using a first dimension mixed-mode column and a second dimension mixed-mode column as disclosed herein, isolating the eluted separated fraction, and reinjecting it into the second dimension mixed-mode column.

Figure 1:
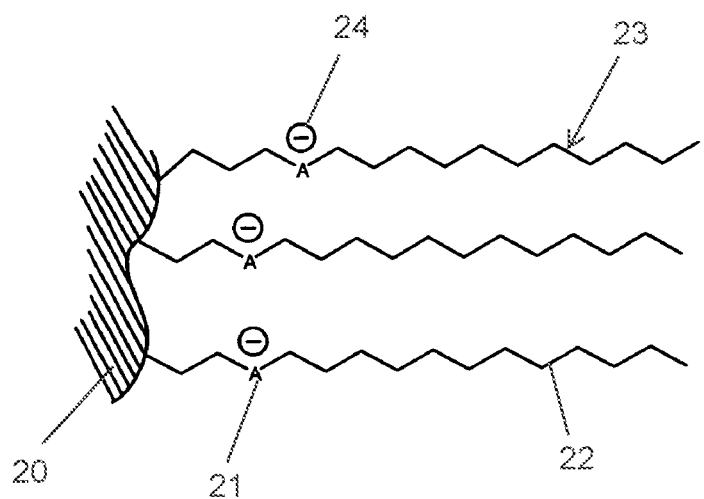
FIG. 1 is a schematic representation of a stationary phase with a ligand structure that performs as mixed-mode chromatography material with anion exchange properties.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE PREFERRED EMBODIMENTS

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated. This invention generally relates to HPLC and to UHPLC, but is not limited thereto and may by employed in other fields as well.

Chromatographic columns are usually packed with a stationary phase, which has a silica gel ($SiO_2$), an alumina ($Al_2O_3$), or a polymer base. Mobile phase, which is typically comprised of a solvent and a buffer, is passed through the stationary phase to effect separation of the various chemical compounds found in the sample. In this manner, an analyte (the compound of interest), can then be analyzed and measured after which it is discharged as effluent to a waste receptacle, or collected as a preparative separation.

In FIG. 1, stationary phase is seen to comprise a rigid supporting material 20, such as silica gel, having attached to its surface an ion bearing functional group 21 and a hydrophobic functional group 22, which are chemically attached together. In FIG. 1, the ligands 23 extending from the supporting material surface are seen to carry negative ions 24. This is the type of chromatographic material found in a Primesep 100 column manufactured by SIELC of Wheeling, Ill.

Figure 2:
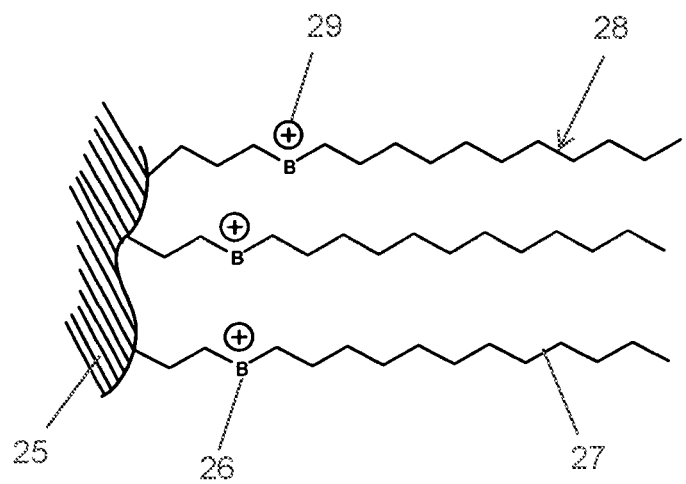
FIG. 2 is a schematic representation of a stationary phase with a ligand structure that performs as mixed-mode chromatography material with cation exchange properties.

In FIG. 2, the supporting material 25 has an ion functional group 26 and a hydrophobic functional group 27 attached with the ligands 28 carrying positive ions 29. This is the type of chromatographic material found in a Primesep SB column manufactured by SIELC. These types of chromatographic separation materials are generally described in Orlovsky et al. U.S. Pat. No. 7,045,059 entitled "Universal Bonded Phase Material for Chromatographic Separation."

Figures 3, 4:
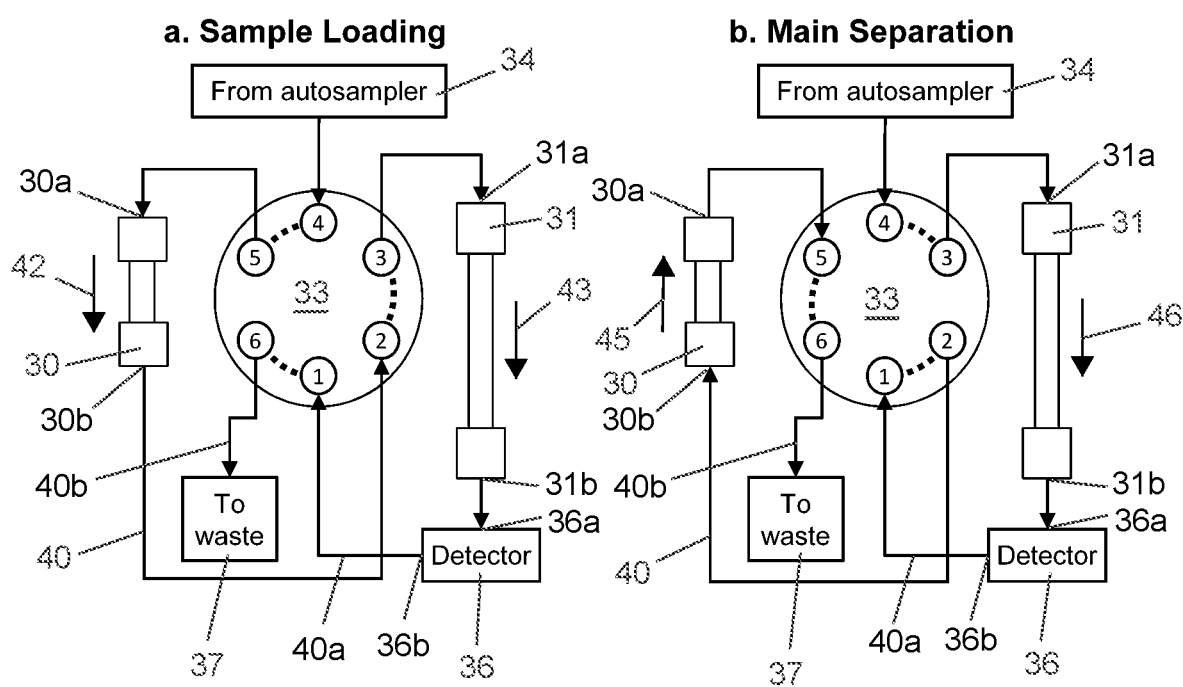
FIG. 3 is a schematic of a first embodiment of a two-column chromatography system showing the flow direction of mobile phase at one setting of a 6-port valve.
FIG. 4 is a schematic of the first embodiment of a two-column chromatography system showing the flow direction of mobile phase at a second setting of a 6-port valve.

In FIGS. 3 and 4, a first exemplary configuration of a chromatography system constructed in accordance with the present disclosure is shown. The system includes a first dimension column 30, a second dimension column 31, a 6-port valve 33, a sample source, such as injector or autosampler 34, a detector 36, and a waste receptacle 37, all connected by external mobile phase flow paths, collectively designated 40. The first dimension column has a first port 30a and a second port 30b. The second dimension column 31 has an inlet port 31a and an outlet port 31b. The detector 36 has an inlet 36a and an outlet 36b. The dashed lines within the valve 33 indicate the flow paths between the various ports within the valve 33, which has multiple positions allowing connections between the external flow paths 40 to be modified. Herein, non-destructive detectors, such as ultraviolet ("UV"), refraction index ("RI"), conductivity, electrochemical, or fluorescent, are utilized.

When the valve 33 is moved to the position shown in FIG. 3, mobile phase exits the upstream sampler 34, enters port 4, exits port 5, passes through port 30a into first dimension column 30 and out port 30b in a direction indicated by arrow 42, enters port 2, exits port 3, passes through port 31a into second dimension column 31 and out port 31b in a direction indicated by arrow 43, passes through inlet 36a into detector 36 out outlet 36b into flow line 40a, enters port 1, exits port 6 into flow line 40b, and the final effluent dumped to downstream waste receptacle 37. In this position, the sample-containing mobile phase passes sequentially through two separate columns 30 and 31.

When the valve 33 is moved to the position shown in FIG. 4, sample-free mobile phase exits the upstream autosampler 34, enters port 4, exits port 3, passes through port 31a into second dimension column 31 and out port 31b in a direction indicated by arrow 46, passes through inlet 36a of detector 36 and out outlet 36b into flow line 40a, enters port 1, exits port 2, passes through port 30b into first dimension column 30 and out port 30a in a direction indicated by arrow 45 (opposite to the direction of arrow 42), enters port 5, exits port 6 into flow line 40b, and the final effluent is dumped to downstream waste receptacle 37. In this position, the sample-containing mobile phase initially passes through the second dimension column 31 upstream of the detector 36 and thereafter output from the detector 36 acting as a fluid source back-flushes and cleans the first dimension column 30.

In chromatography tests described hereafter, a Model 1100 HPLC instrument from Agilent of Santa Clara, Calif., with a diode array detector ("DAD") and a programmable switching valve in the column compartment was employed. Chemicals used were acetonitrile (HPLC grade), sulfuric acid (semiconductor grade), sodium nitrate (ACS grade), and distilled water. The HPLC columns were standard commercial products manufactured by SIELC.

Fruits and vegetables from local stores or gardens were crushed or pureed in a blender, filtered, and the whole juice was used for analysis. Water samples were used directly. Chicken broth was homemade from raw chicken with about 1 pound of chicken per 1 liter of water. Sausage samples were homogenized in a blender with an equal amount of water and then filtered. All samples were filtered through 0.25 µm nylon filter prior to analysis.

The system of FIGS. 3 and 4 employed a high-pressure 6-port valve that was placed between the autosampler 34 and the second dimension column 31 and was actuated by the chromatography system at a defined time after the injection. A first dimension column 30 was connected to the ports of the switching valve 33 that allowed modification of the relative positions of the columns within the chromatography flow path. In this setup, a sample was first introduced to the first dimension column 30. The first dimension column 30 passed analytes through while retaining the late eluted components of the sample. When the valve 33 was actuated at the predetermined time after injection, the late eluted components, while still in the first dimension column 30, are back-flushed to waste by the flow coming from the detector output. Valve timing is dependent on the type of sample and the nature of the analytes. This configuration setup may be used in the analysis of nitrate concentrations in food products.

Figure 7:
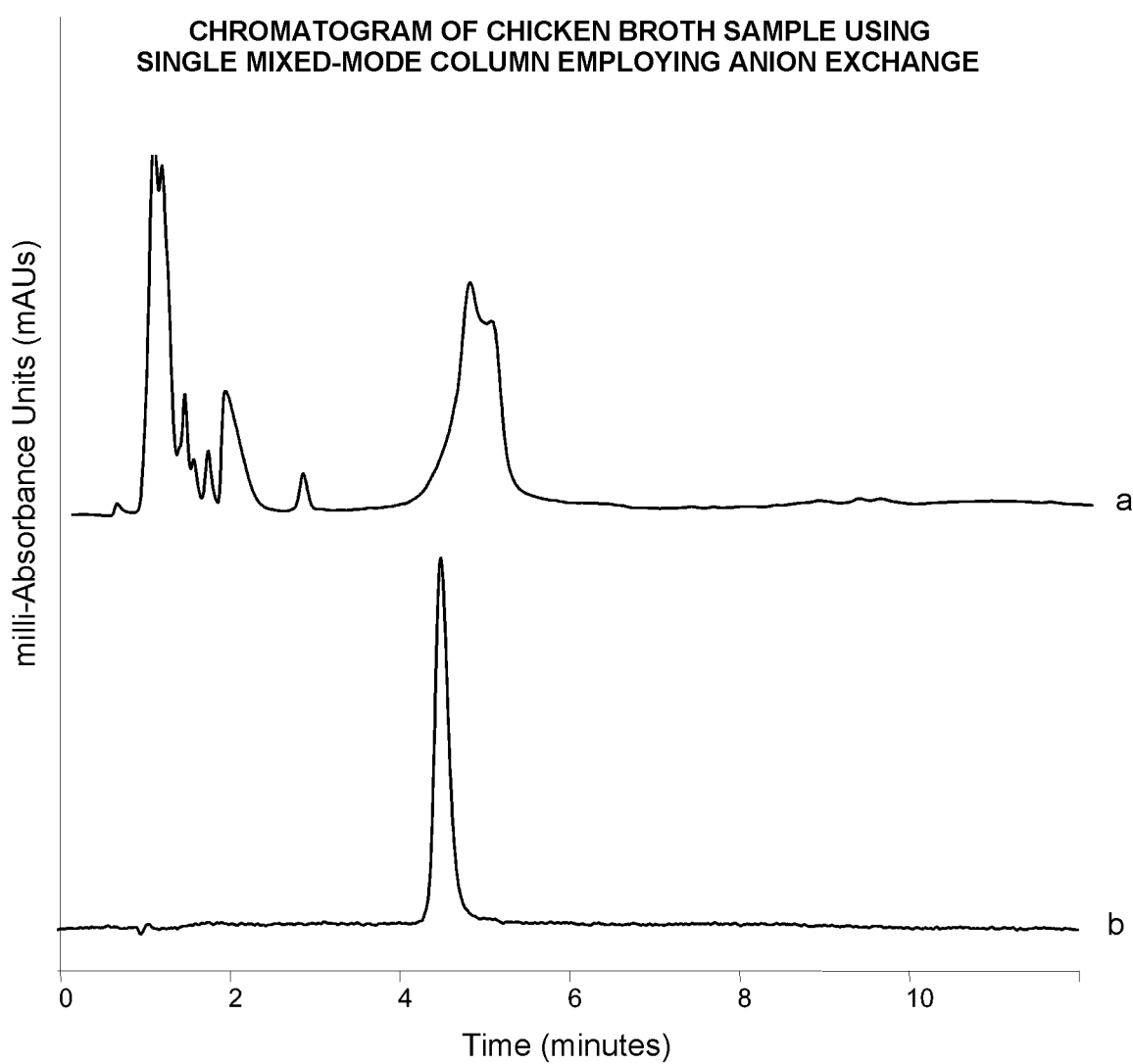
FIG. 7 is a chromatogram of a chicken broth sample and a sodium nitrate standard taken on a single-column chromatography system including a mixed-mode column that retains anions by anion exchange.

FIG. 7 is a chromatogram showing the results of analyzing a chicken broth sample (top line a) and a sodium nitrate sample (bottom line b) using a single column. The results were obtained by injecting a sample into a column directly coupled to the autosampler. The test was conducted using an analytical Primesep SB column 4.6×50 mm with a mobile phase of gradient MeCN 20-70% in 8 min+3 min hold, a buffer of 0.4% $H_2SO_4$, a sample injection volume of 20 µm, and a UV wavelength of 200 nm. In this chromatographic setting, the detection of nitrates is impossible due to the significant interference of the nitrate peak with different components of the chicken broth sample.

Figure 8:
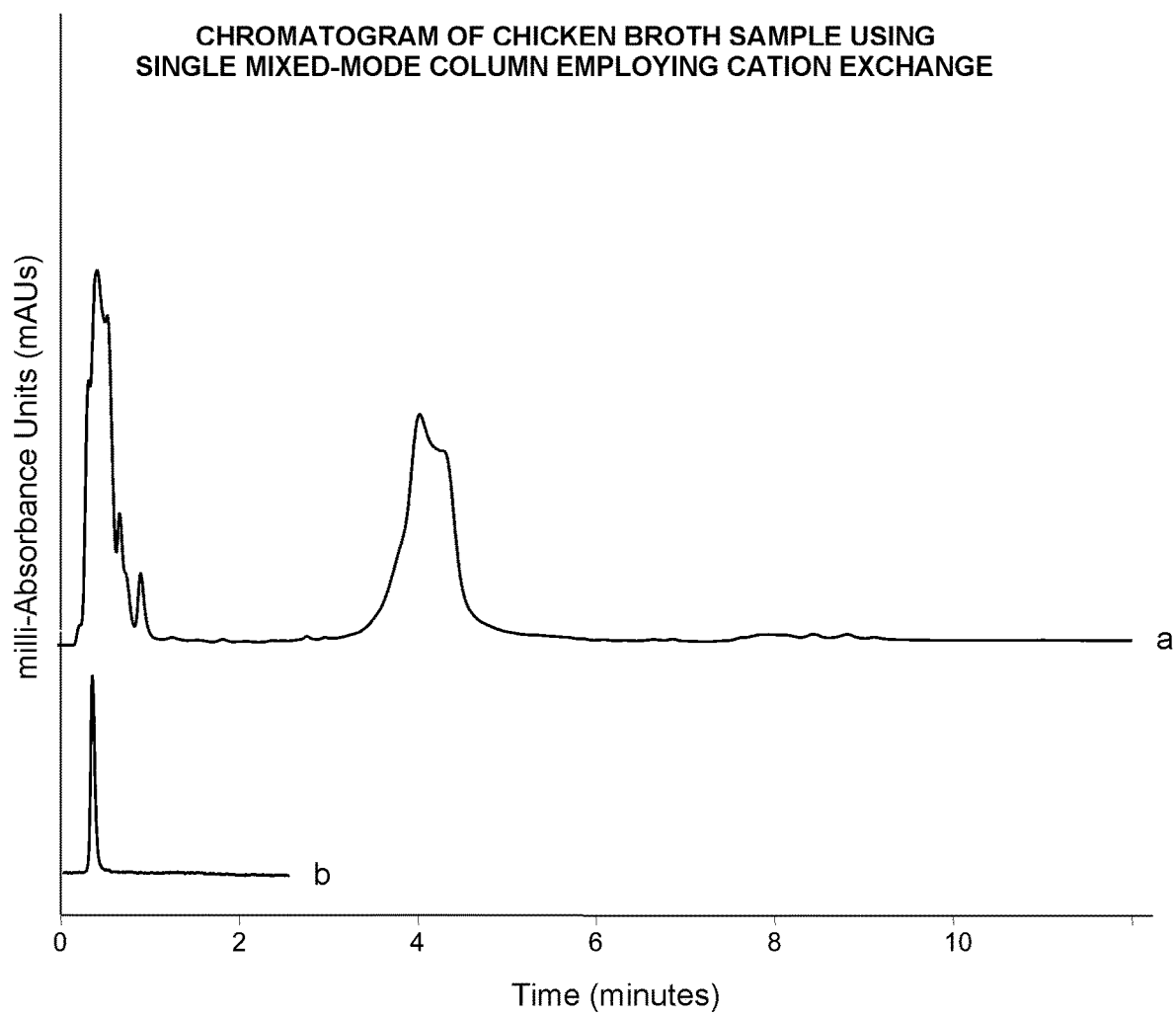
FIG. 8 is a chromatogram of a chicken broth sample and a sodium nitrate standard taken on a single-column chromatography system including a mixed-mode column that retains cations by cation exchange.

FIG. 8 is a chromatogram showing the results of analyzing a chicken broth sample (top line a) and a sodium nitrate sample (bottom line b) using a single column. The results were obtained by injecting a sample into a column directly coupled to the autosampler. The test was conducted using an analytical Primesep 100 column 4.6×25 mm with a mobile phase of gradient MeCN 20-70% in 8 min+3 min hold, a buffer of 0.4% $H_2SO_4$, a sample injection volume of 20 µm, and a UV wavelength of 200 nm. In this chromatographic setting, the detection of nitrates is impossible due to the low retention of nitrate ion in the column and the significant interference of the nitrate peak with different components of the sample.

Figure 9:
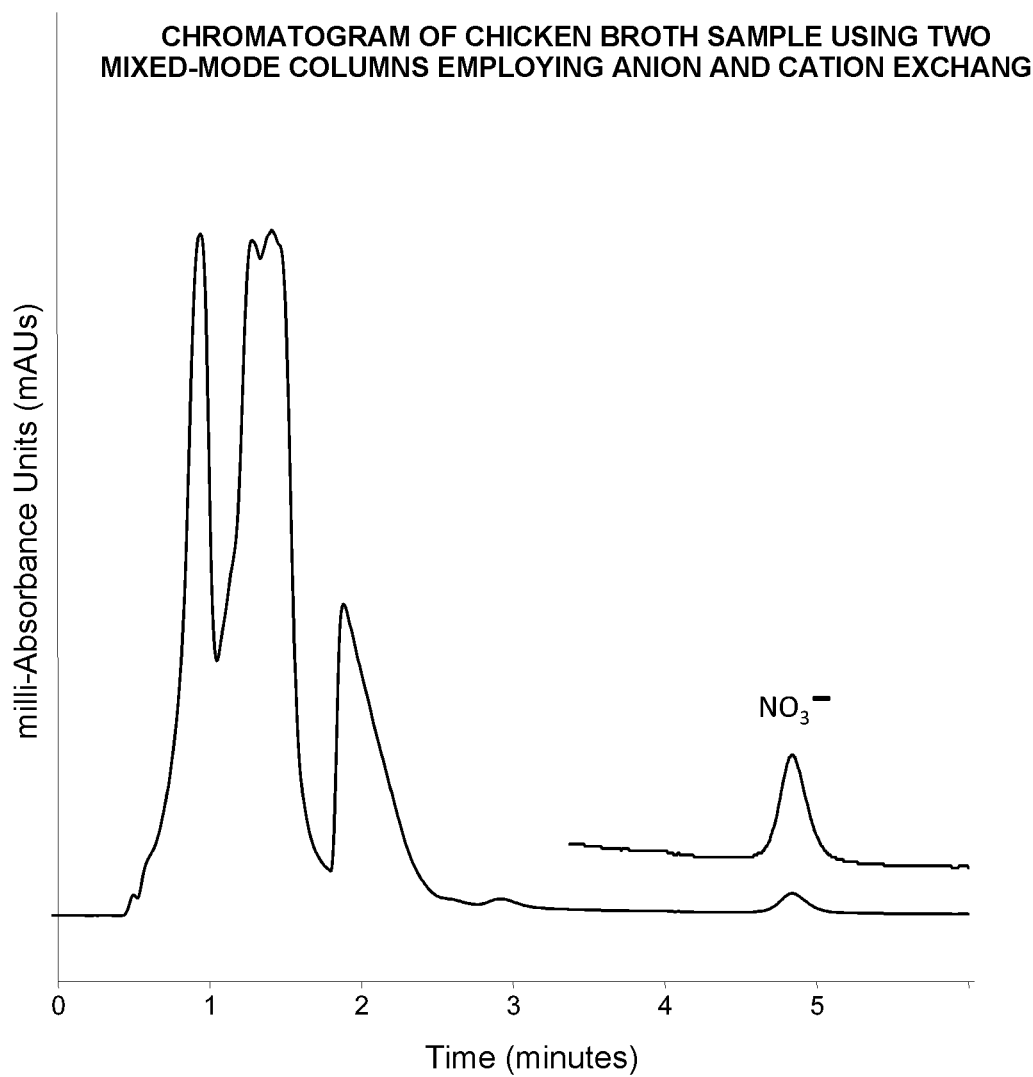
FIG. 9 is a chromatogram of a chicken broth taken on a two-column chromatography system including a mixed-mode column that retains anions by anion exchange and a second mixed-mode column that retains cations by cation exchange with an enlargement of the sodium nitrate peak inserted above the graph line.

FIG. 9 is a chromatogram showing the results of analyzing a chicken broth sample using two columns (bottom line) with an added enlargement of the sodium nitrate peak therein being shown (short top line). The test was conducted using a Primesep 100 4.6×25 mm and a Primesep SB 4.6×50 mm with a switching valve actuated at 30 seconds, a mobile phase of MeCN 20%, a buffer of 0.4% $H_2SO_4$, a sample injection volume of 20 µm, and an UV wavelength of 200 nm. All the impurities were removed from the chromatogram in the time and space where the nitrate peak is eluted in the dual column combinational system. The nitrate peak is sufficiently isolated from all the impurities and is available for measuring up to the physical detector noise level.

The use of a switching valve to change mobile phase flow direction has the benefit of shortening analysis time, since the second dimension column may not need to be washed after each sample injection. This is important when multiple repetitive samples are analyzed. The shortening of the run time also reduces solvent consumption and saves time on solvent preparation. Since late eluted impurities never reach the second dimension column, the lifetime of the second dimension column is significantly increased.

In the example above, the first dimension column used is the Primesep 100, which does not retain the nitrate ion as seen in FIG. 9. However, the first dimension column retains all the positively charged and hydrophobic impurities. After the valve is actuated, the retained material in the first dimension column gets back-flushed. The analytical Primesep SB column functions oppositely and retains all the negatively charged compounds. Therefore, the nitrate ions are retained and separated from the other similarly charged molecules.

In these experiments, the first dimension column was a Primesep 100, which has a reverse phase packing with acidic functional groups that are schematically presented in FIG. 1. The Primesep SB, which was used as the main second dimension column, has strong basic functional groups attached to the hydrophobic ligands that are schematically presented in FIG. 2.

By changing the valve actuation time, the type of material that reaches the second dimension column can be regulated. This method is universal and is flexible in removing matrix effects for different samples and analytes.

Using this technique, it is possible to measure the amount of nitrates in different food products. The calibration was performed with a sodium nitrate standard by serial dilution. The injection volume for the nitrate standards was 5 µL. The injection volume of samples varied from 5 µl to 50 µl and calculated concentration of nitrate adjusted accordingly. Nitrate concentrations found in typical food items are listed in the table of FIG. 10.

Figures 5, 6:
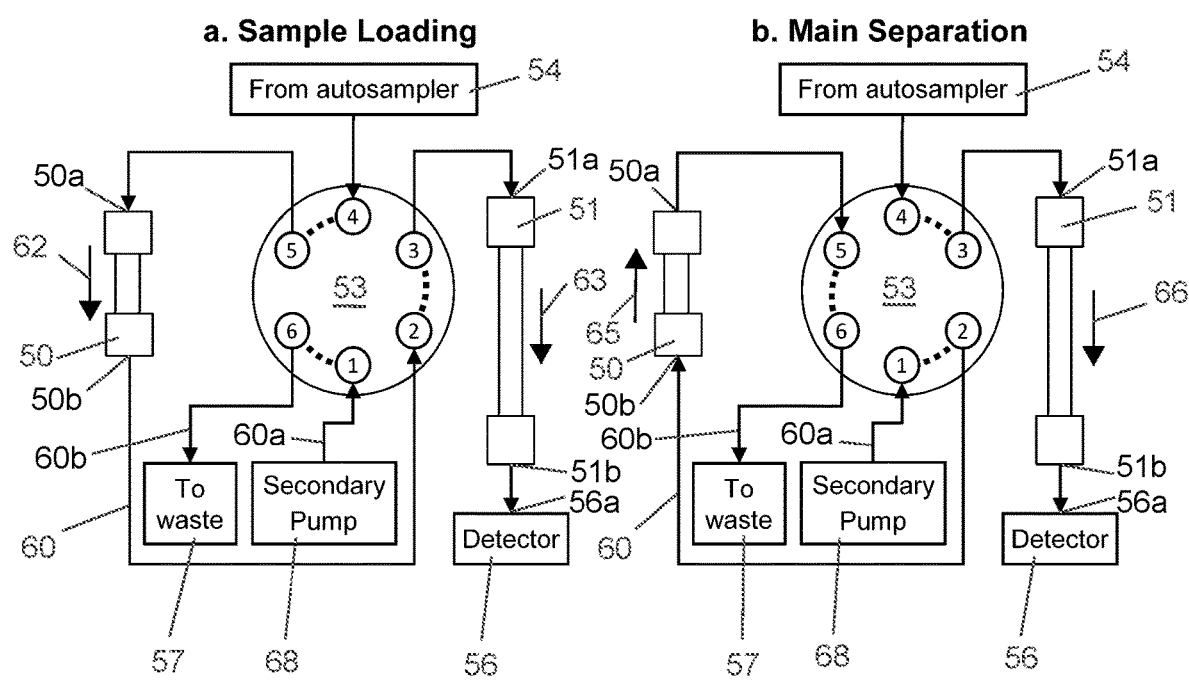
FIG. 5 is a schematic of a second embodiment of a two-column chromatography system showing the flow direction of mobile phase at one setting of a 6-port valve with a mass-spectrometer type detector.
FIG. 6 is a schematic of the second embodiment of a two-column chromatography system showing the flow direction of mobile phase at a second setting of a 6-port valve with a mass-spectrometer type detector.

When using mobile phase destructive detectors, such as mass spectrometry ("MS"), evaporative light scattering ("ELSD"), or charged aerosol ("CAD"), in a HPLC system, a different setting for the flow paths, collectively designated as 60, needs to be organized with an additional secondary pump 68 providing fluid from a secondary source for flushing of the first dimension column 50 as shown in the second exemplary embodiment illustrated in FIGS. 5 and 6.

When the valve 53 is moved to the position shown in FIG. 5, mobile phase exits an upstream sample source, such as autosampler 54, enters port 4, exits port 5, passes through port 50a into first dimension column 50 and out port 50b in a direction indicated by arrow 62, enters port 2, exits port 3, passes through port 51a into second dimension column 51 and out port 51b in a direction indicated by arrow 63, passes through inlet 56a into mass-spectrometer type detector 56, and is expelled through an outlet (not shown). At this point, the secondary pump 68 is not functional. In this position, the sample-containing mobile phase passes sequentially through two separate columns 50 and 51.

When the valve 53 is moved to the position shown in FIG. 6, sample-free mobile phase exits upstream autosampler 54, enters port 4, exits port 3, passes through port 51a into second dimension column 51 in a direction indicated by arrow 66, passes through port 56a into a mass-spectrometer type detector 56, and is expelled through an outlet (not shown). Fluid drawn from a secondary source (not shown) exits from the now-functioning secondary pump 68 into flow line 60a, enters port 1, exits port 2, passes through port 50b into first dimension column 50 and out port 50a in a direction indicated by arrow 65 (opposite to the direction of arrow 62), enters port 5, exits port 6 into flow line 60b, and the final effluent is dumped to the downstream waste receptacle 57. In this position, the sample-containing mobile phase initially passes through the second dimension column 51 upstream of the detector 56 and fluid output from the secondary pump 68 acting as a fluid source back-flushes and cleans the first dimension column 50.

Figure 11:
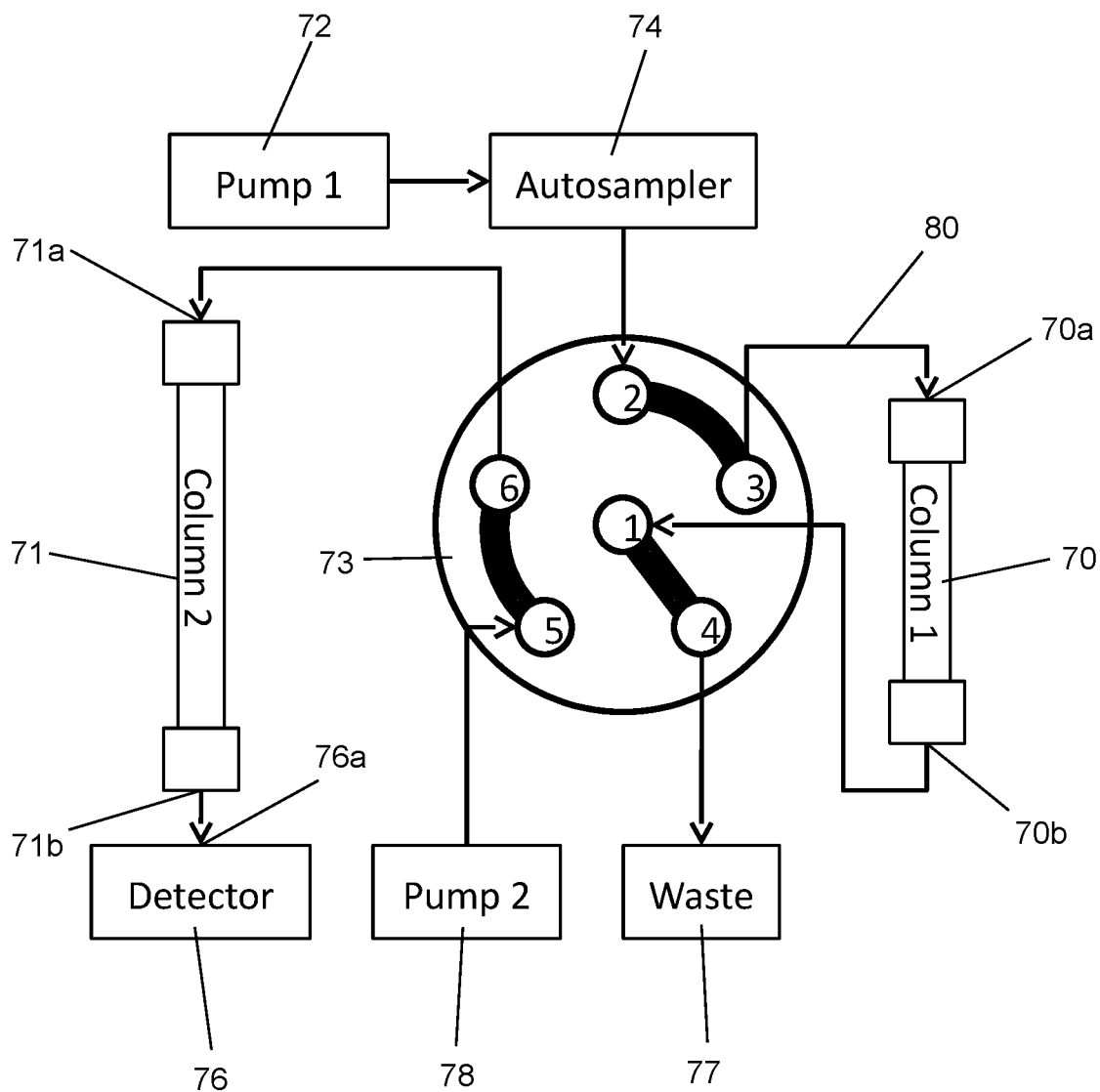
FIG. 11 is a schematic of a third embodiment of a two-column chromatography system showing the flow direction of mobile phase at one setting of a 6-port valve with a detector.
Figure 12:
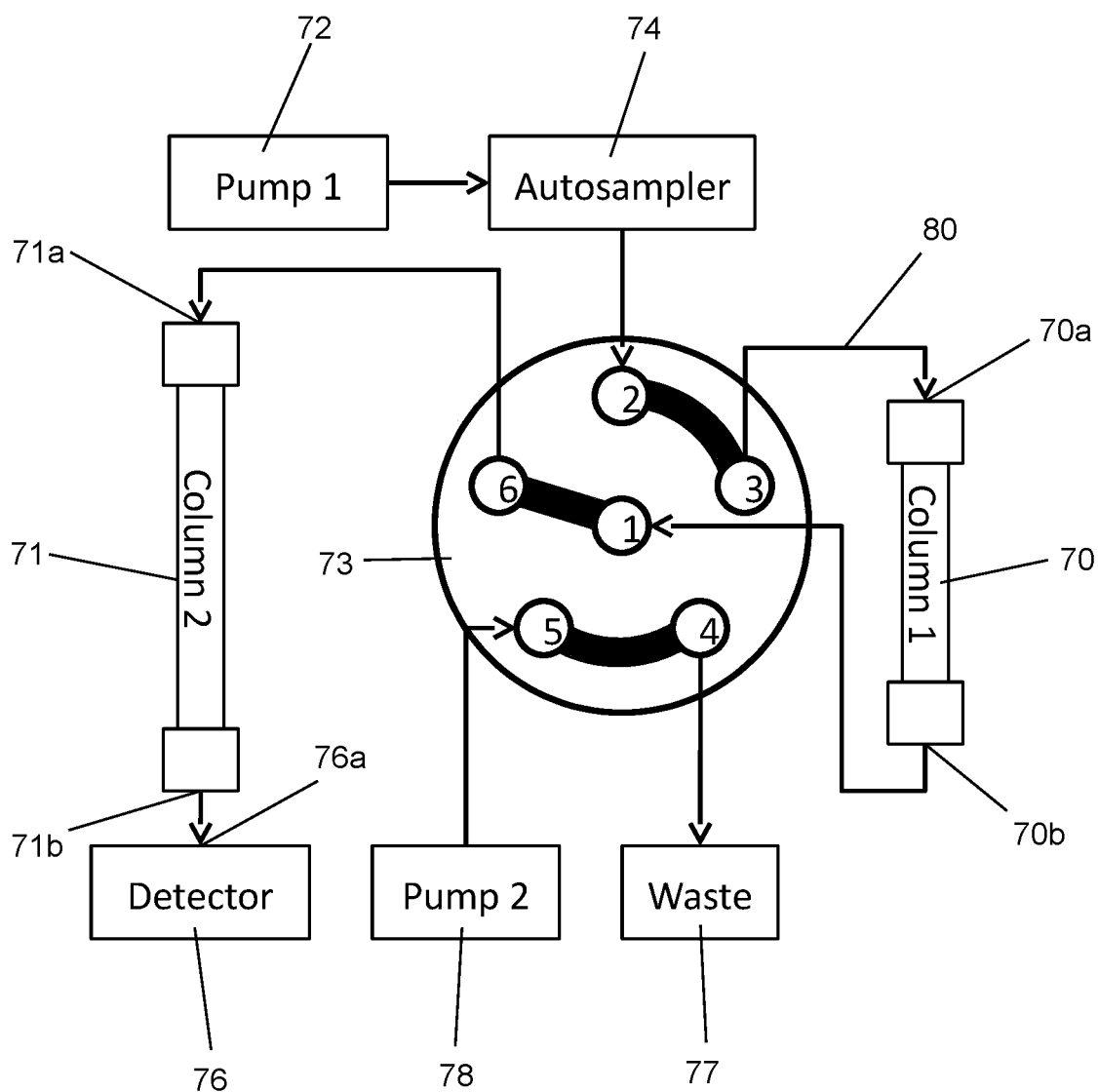
FIG. 12 is a schematic of the third embodiment of a two-column chromatography system showing the flow direction of mobile phase at a second setting of a 6-port valve with a detector.
Figure 13:
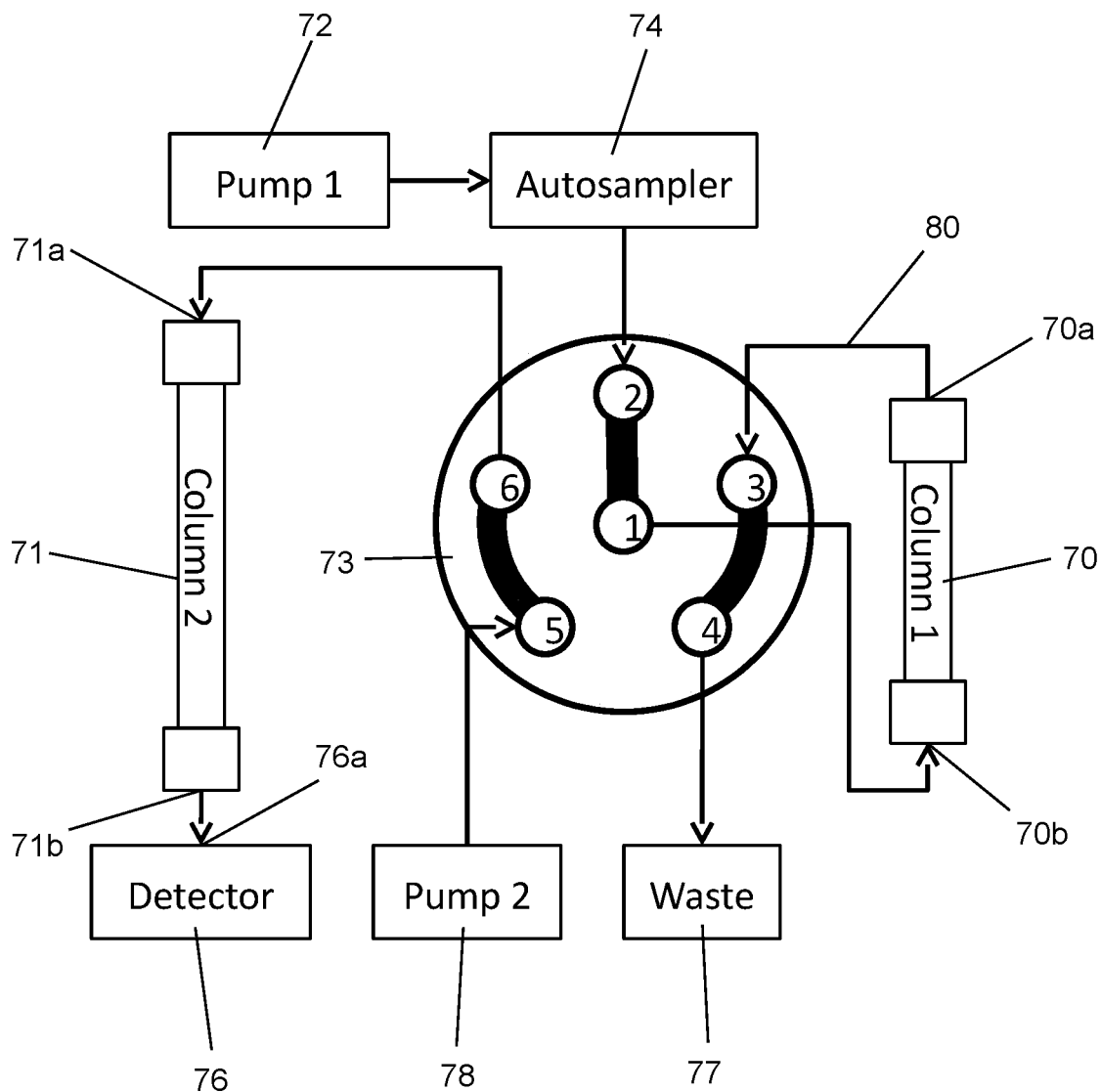
FIG. 13 is a schematic of the third embodiment of a two-column chromatography system showing the flow direction of mobile phase at a third setting of a 6-port valve with detector.

In FIGS. 11-13, a third exemplary embodiment is shown of a chromatography system for analyzing or isolating compounds or other components contained within a sample. The system includes a first dimension chromatography column 70, a second dimension chromatography column 71, a pump 72, a 6-port switching valve 73, a sample source, such as injector or autosampler 74, a detector 76, a waste collector, such as receptacle 77, and a secondary pump 78, all connected by external mobile phase flow paths, collectively designated 80.

The column 70, which functions as a cleaning column, has a first port 70a and a second port 70b. The column 71 has an inlet port 71a and an outlet port 71b. The detector 76 has an inlet 76a and an outlet (not shown). The pump 72 creates a flow stream of mobile phase, and the secondary pump 78 provides sample-free mobile phase. The switching valve 73, which may be operated programmatically, effects change of the overall flow path of mobile phase through the system. The curved bold lines shown in the figures indicate the flow paths between the various ports within the valve 73, which has multiple positions allowing connections between the various external flow paths 80 to be modified.

In two-dimensional (2D) chromatography, sample containing target components to be analyzed or isolated are separated using two columns usually connected in sequence so that mobile phase from the first column passes serially to the second column. Either column may have reverse type stationary phases with negatively charged functional groups, positively charged functional groups, or any other characteristic as may be required. Preferably, the columns have orthogonal retention characteristics. Here, the first column 70 is a first dimension separation column and the second column 71 is a second dimension separation column. Columns of the type described herein are available from SIELC Technologies, located in Wheeling, Ill.

When the valve 73 is moved to the position shown in FIG. 11, mobile phase is pumped from a suitable supply (not shown) into the autosampler 74, where a sample analyte is injected into the flow stream. Thereafter, the resulting mobile phase exits the autosampler 74, enters valve port 2, exits valve port 3, passes through port 70a into the column 70 exits port 70b, enters valve port 1, exits valve port 4, and is dumped to waste receptacle 77. At the same time, the secondary pump 78 delivers sample-free mobile phase to valve port 5, which exits valve port 6, passes through port 71a into column 71 exits output port 71b, and passes through inlet 76a into detector 76. In this valve position, at least some of the unwanted early eluting sample components are separated in the first column 70 and dumped to waste before they can enter the second column 71. Simultaneously, any material or any sample components that may be present in the second column 71 or the detector 76 are flushed.

When it is determined that a desired fraction of the sample having the target components has been separated from the mobile phase (even in the middle of separation), the valve 73 is moved to a second position shown in FIG. 12, where mobile phase pumped from the autosampler 74, enters valve port 2, exits valve port 3, passes through port 70a into the first column 70 exits port 70b, enters valve port 1, exits valve port 6, passes through input port 71a into the second column 71 exits output port 71b, and passes through inlet 76a into detector 76. The secondary pump 78 is shunted to the waste receptacle 77 via valve ports 4 and 5. In this position, the desired fraction of the sample-containing mobile phase will pass sequentially through the first and second columns 70 and 71 with the first column 70 having separated unwanted early eluted portions from the target portions of the mobile phase before the target portions enter and are further separated by the second column 71 and analyzed in the detector 76.

At a defined time after injection of the sample (the time depending on the nature of the analyte), the late eluted sample components while still in the column 70 are flushed or backwashed to the waste receptacle 77. This is achieved by actuating the valve 73 to move it to a third position shown in FIG. 13. Mobile phase, which may now be sample free, flows through the autosampler 74, enters valve port 2, exits valve port 1, passes through port 70b into column 70 in a reverse flow direction exits port 70a, enters valve port 3, exits valve port 4, and is dumped to waste receptacle 77, or a fraction collector (not shown) substituted for the waste receptacle. At the same time, sample-free mobile phase from the secondary pump 78 enters valve port 5, exits valve port 6, passes through inlet port 71a into the second column 71 exits outlet port 71b, and passes through inlet 76a through the detector 76. In this position, the first column 70 is backwashed and the second column 71 and the detector 76 are flushed with sample-free mobile phase from the secondary pump 78.

Often when samples of complex compounds are being analyzed, the target compound will only be a small percentage of the overall sample. Much of the sample will be unwanted material or other contaminants or impurities. Long run times are often required to obtain sufficient analyte resulting in greater amounts of unwanted material collecting within the columns. It is desirable therefore to eliminate or at least minimize this unwanted material prior to it reaching the analytic second dimension column. This is particularly important where the second dimension column is costly.

Contaminants often cause a column to deteriorate very quickly rendering them unusable, since the contaminants are retained in the column for a very long time or they cannot be completely flushed from the column. In the exemplary systems disclosed herein, columns can be used many times, perhaps, a hundred or more times, and still achieve better resolutions with more defined separations.

Figure 14:
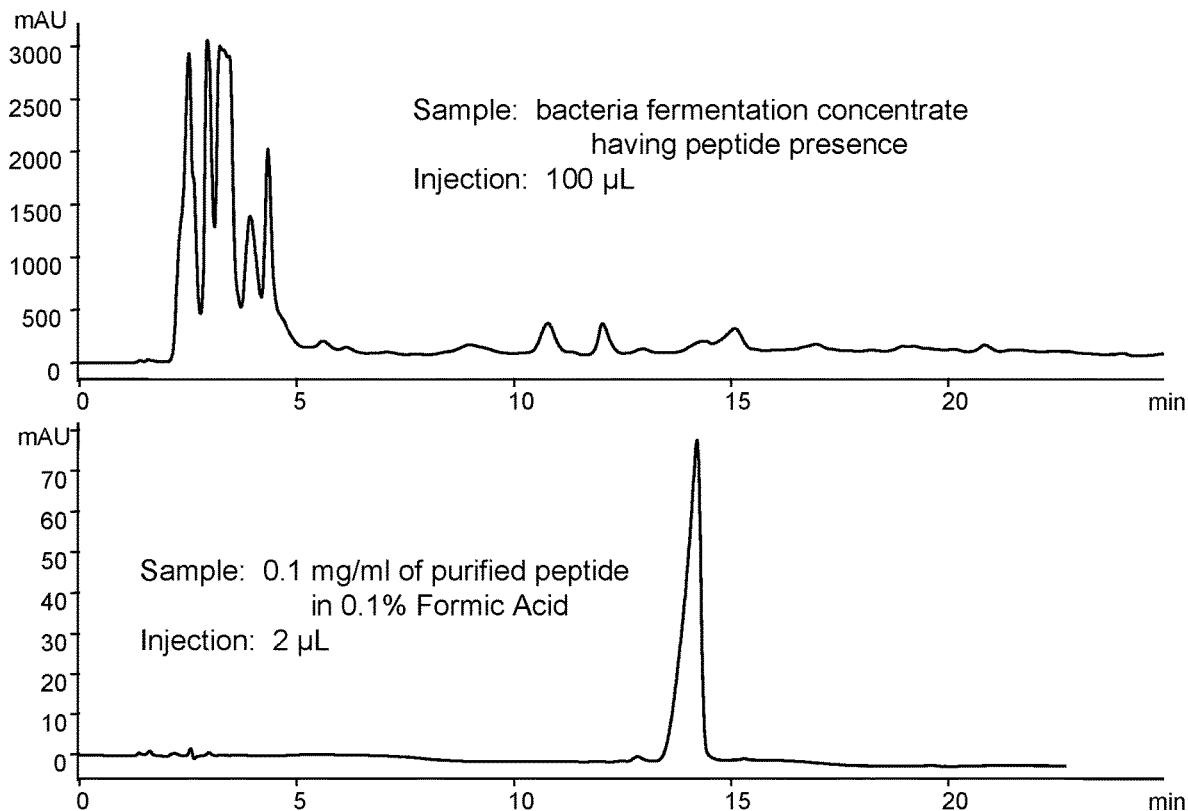
FIG. 14 shows two chromatograms using a single first dimension mixed-mode column for analysis, one being a sample of bacteria fermentation concentrate having peptide presence and the other being a sample of a purified peptide in formic acid.

FIG. 14 shows chromatograms obtained when using a single column on two different samples containing peptides. The top graph shows a plot with multiple peaks when a typical bacteria fermentation concentrate having a peptide presence is analyzed. The bottom graph shows plot with a distinct peak when a purified peptide is analyzed.

Figure 15:
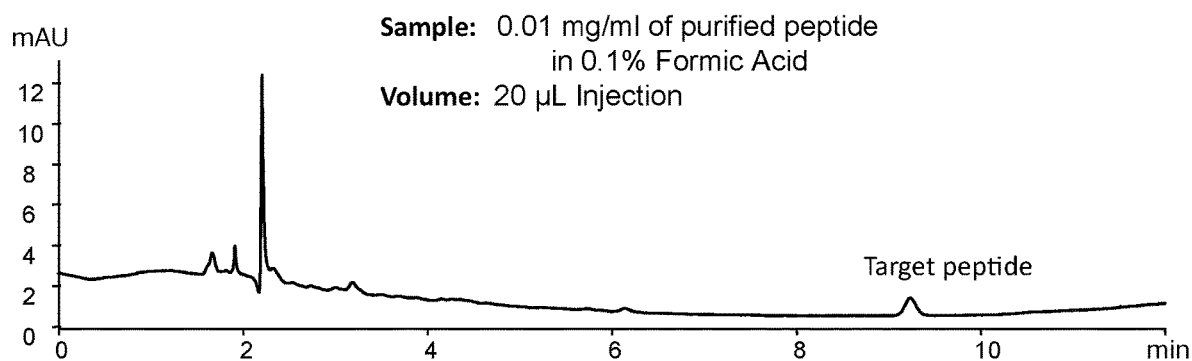
FIG. 15 is a chromatogram using a single second dimension column to analyze a sample of purified peptide in formic acid.

FIG. 15 shows a chromatogram obtained when a different column is used to analyze the purified peptide. The peptide peak is not as well defined as the other peaks along the plot line.

FIG. 16 is a chromatogram obtained when using a first dimension column and a second dimension mixed-mode column as disclosed herein to analyze a purified peptide. Here, because of greater resolution, the target peptide peak is more readily distinguishable along the plot line from the preceding and succeeding peaks.

Figure 17:
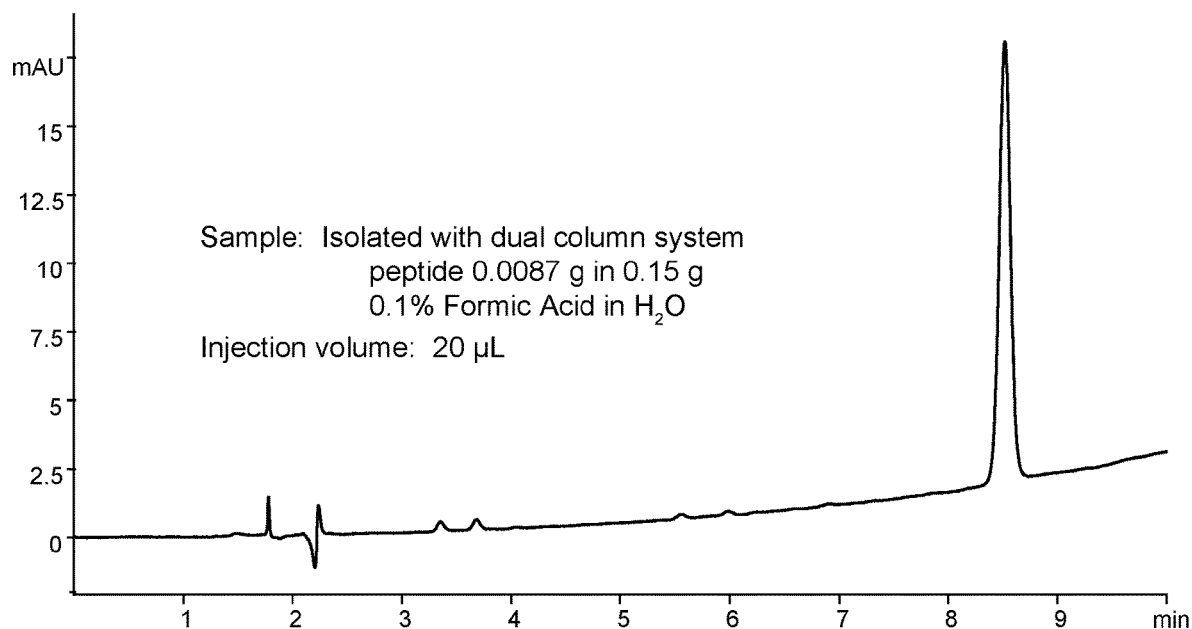

FIG. 17 is a chromatogram obtained when using a first dimension column and a second dimension mixed-mode column as disclosed herein, isolating the eluted separated fraction exiting the second dimension column, and re-injecting it into the second dimension column. The resulting peak of the targeted peptide is well purified.

INDUSTRIAL APPLICABILITY

It is understood that while application of the disclosed apparatus and method can be adapted to many uses, modifications of this device and method can be made to accommodate specific engineering goals.

A HPLC system with first and second dimension columns having orthogonal retention characteristics and including a valve to modify stream flow direction for analysis and cleaning eliminates coeluting impurities from the chromatogram, shortens analysis time, and increases the life of the columns in the analysis. It also allows the analysis of target compounds in complex mixtures of different origin and composition with a single method. It eliminates the need for complex sample cleaning prior to the analysis. The result of which time and money are saved.

The presented example of nitrate measurement can be applied to other inorganic ions such as bromide, iodide, and many charged organic molecules with both positive and negative functional groups. Also presented is an example of protein isolation that can be applied for different peptides and proteins.

Other aspects, objects and advantages of this invention can be obtained from a study of the drawings and the foregoing disclosure.

From the foregoing, it will be observed that numerous variations and modifications may be effected without departing from the spirit and scope of the invention. It will also be observed that the various elements of the invention may be in any number of combinations, and that all of the combinations are not enumerated here. It will be understood that no limitation with respect to the specific apparatus illustrated herein is intended or should be inferred. While specific embodiments of the invention have been disclosed, one of ordinary skill in the art will recognize that one can modify the materials, dimensions and particulars of the embodiments without straying from the inventive concept.

What is claimed is:

1. A high pressure liquid chromatography system for analyzing or isolating target components in a sample, the system comprising:
   at least one pump for creating a mobile phase flow stream;
   an injector for placing the sample into the mobile phase flow stream;
   a first chromatography column and a second chromatography column, each chromatography column having an inlet and an outlet, and at least one of the chromatography columns being a mixed-mode column;
   a detector for monitoring composition of the mobile phase flow stream;
   a switching valve with multiple ports providing connections to the first chromatography column and the second chromatography column and controlling the direction of the mobile phase stream flow to the first chromatography column and the second chromatography column;
   the switching valve operable in a first position to connect the injector with the inlet of the first chromatography column, and the outlet of the first chromatography column to waste and to direct sample-free mobile phase flow to the inlet of the second chromatography column;
   the switching valve operable in a second position to connect the outlet of the first chromatography column with the inlet of the second chromatography column;
   the switching valve operable in a third position to connect the inlet of the first chromatography column with waste or fraction collector and to direct sample-free mobile phase to the inlet of the second chromatography column;
   wherein when the switching valve is in the first position, the target components are at least partially separated from unwanted early eluted sample components in the first chromatography column prior to transfer of the target components to the second chromatography column;
   wherein when the switching valve is in the second position, the target components are transferred to the second chromatography column while unwanted late eluted sample components remain in the first chromatography column; and,
   wherein when the switching valve is in the third position, the mobile phase flows in reverse through the first chromatography column to backwash the first chromatography column and unwanted sample components are directed to waste, while target components are further separated in the second chromatography column.

2. The system of claim 1 wherein the first chromatography column is a mixed-mode column.

3. The system of claim 1 wherein the switching valve is a 6-port programmable switching valve.

4. The system of claim 1 wherein the first chromatography column is a first dimension separation column.

5. The system of claim 4 wherein the first dimension separation column has a reverse type stationary phase with negatively charged functional groups.

6. The system of claim 4 wherein the first dimension separation column has a reverse type stationary phase with positively charged functional groups.

7. The system of claim 1 wherein the second chromatography column is a second dimension separation column.

8. The system of claim 7 wherein the second dimension separation column has a reverse type stationary phase with positively charged functional groups.

9. The system of claim 7 wherein the first dimension separation column has a reverse type stationary phase with negatively charged functional groups.

10. The system of claim 1 wherein the first chromatography column and the second chromatography column have orthogonal retention characteristics.

11. The system of claim 1 wherein the first chromatography column and the second chromatography column are both mixed-mode columns.

12. A method of analyzing or isolating target components in a sample in a high pressure chromatography system, the method comprising:
- (a) injecting a sample into a mobile phase flow stream;
- (b) moving mobile phase for a period of time in a first direction through a first mixed-mode chromatography column to waste and simultaneously moving sample components through a second mixed-mode chromatography column;
- (c) moving mobile phase in the first direction serially through the first mixed-mode chromatography column to obtain a first separation and the second mixed-mode chromatography column to obtain a second separation;
- (d) moving mobile phase through the first mixed-mode chromatography column in a reverse flow direction to waste and simultaneously moving sample components through the second mixed-mode chromatography column in the first direction to continue the second separation;
- (e) analyzing components after the second separation in a detector; and,
- (f) repeating steps (a) through (e) if any additional samples are to be separated or analyzed.

* * * * *